United States Patent Office 3,256,856
Patented June 21, 1966

3,256,856
METHOD OF INTRODUCING SMALL CONTROLLED AMOUNTS OF TREATMENT MATERIALS INTO AVIAN EGGS
Marvin W. Nicely and Francis C. Moore, Indianapolis, Ind., assignors of one-third to Francis C. Moore, one-third to Wilbur E. Fernandes, and one-third to Poly-Tech Inc.
No Drawing. Filed Aug. 19, 1964, Ser. No. 390,716
4 Claims. (Cl. 119—1)

This invention relates to an egg treatment method, and more specifically, to an improved method for introducing small but precisely-controlled amounts of treatment materials into fertilized avian eggs, and the application is a continuation-in-part of our co-pending application Serial No. 292,813, filed June 28, 1963, now Patent No. 3,148,649 which pertains to a method of introducing controlled amounts of treatment materials into avian hatching eggs. In the method of the co-pending application, a group of fertilized hatching eggs are placed in a liquid bath contained in a chamber at atmospheric pressure. The bath contains a selected concentration of an egg treating material such as, for example, a bactericide, disinfectant, anti-biotic, hormone, fungicide or other chemical substance which might advantageously be introduced into an egg prior to or during incubation. After the eggs have been placed within the bath, the pressure is gradually reduced until a negative pressure within a selected range is reached. The air within the eggs is thereby withdrawn through the pores thereof. When atmospheric pressure is restored, a predetermined quantity of the egg-treating material is forced through the pores of the shells by such pressure to replace the air previously withdrawn from the eggs.

While such a method is highly effective for introducing materials into hatching eggs, it is apparent that for proper dosage control careful regulation of both pressure and time is important. Because of the small size of the egg's pores, which range in size between approximately .005 to .002 of an inch, a definite interval of time is required for equalization pressure within the eggs after atmospheric pressure in the bath has been restored. If this time interval is varied from batch to batch, a variation in dosage will necessarily result.

It has also been found that slight differences in the pore sizes of the shells will have a small but significant effect on the amount of material introduced into the eggs. For many purposes, as where a bactericide or anti-biotic is to be introduced into the eggs, the variations in pore sizes of different eggs in the same batch may not significantly vary the results. However, such differences in the numbers and sizes of pores does become important where the amount of treatment material introduced into each egg must be controlled with a high degree of precision and must be uniform for all of the eggs in a batch. This is especially true where the treatment involves the inoculation of the eggs with small amounts of virus-containing materials. In the past, it has been considered necessary to inject such materials into each individual egg by means of a hypodermic syringe in order to insure the introduction of uniform and precisely-controlled amounts into the eggs.

Accordingly, it is an object of the present invention to provide an improved method by which a large number of fertilized viable eggs may be simultaneously treated so as to introduce into such eggs precisely-controlled and uniform amounts of treatment materials. In this connection, it is a specific object to provide a method which is suitable for simultaneously inoculating large numbers of eggs with virus-containing materials, as well as for introducing into such eggs other types of materials such as antibiotics, bactericides, hormones, and the like. Other objects will become apparent as the specification proceeds.

An important aspect of the present invention lies in the discovery that if one or more small openings are drilled, punched, or otherwise formed in the shells of viable avian eggs, the amount of liquid treatment material introduced into a batch of such eggs, following the pressure-chamber injection technique of our co-pending application, will be substantially uniform for all of the eggs of the batch as long as the artificially-formed openings in the eggs are of the same size, number, and location. While more than a single opening or hole might be provided in each egg, it has been further found that highly effective results are obtained when only a single small hole is drilled or otherwise formed in each shell.

Specifically, it has been found that through the use of dye solutions that if a punctured hole is appreciably larger than the pore size of the egg, that is, substantially larger than .002 inch, the treatment solution will flow through the relatively large diameter punctured hole and not through the pores of the egg. If the hole size is less than approximately .007 inch in diameter, the amount of fluid passing into the egg will be determined in part by the pressure conditions and the length of time the egg is left in solution. On the other hand, if the hole size is greater than .007 inch, the amount of fluid drawn or forced into the egg is relatively uniform despite variations in negative (or positive) pressure and in the time of immersion. To put it differently, with a hole larger than .007 inch, the flow through the opening results in almost immediate replacement of the withdrawn air by the treatment material regardless of pressure and time variations.

The hole or holes may be formed in the egg in any suitable manner. Both drilling and punching techniques have been used with success. Any technique may be used which results in the formation in each egg of a hole of predetermined and uniform size without attending damage to the remainder of the shell.

As already mentioned, the hole or holes formed in each egg must be substantially larger than the pores of the shell. While the effective lower size limit appears to be approximately .007 inch, it is preferable that the hole size exceed .02 inch in diameter. Normally the size of the hole should not exceed .06 inch in diameter although the maximum size limitation is based on practical considerations and is not critical.

Preferably the hole should be formed in the air cell end of the egg. When the hole is so located, the inner membrane of the egg provides the single membrane to which the fluid must pass whereas if the hole is formed elsewhere in the shell the passage of fluid tends to be obstructed. It has been found that under similar time and pressure conditions (5 inches of negative pressure) and with holes of equal size (.031 of an inch) differing only in location, approximately .5 of a cubic centimeter of liquid will enter the egg having a hole formed in the air cell end thereof while approximately .25 of a cubic centimeter of fluid will be drawn into the egg with the hole formed in the side or opposite end. In either case, however, the metabolic processes of the embryo will result in the assimilation of the treatment material. To avoid the possibility of injury to an embryo as a result of the drilling or puncturing step, it is important that the opening extend no substantial distance inwardly beyond the shell and the inner membrane immediately adjacent the inner surface of the shell.

After the holes have been formed in a number of fertilized viable eggs, the eggs are placed in a liquid bath containing the treatment material. The apparatus may be identical to that discovered in the aforementioned co-pending application and since such apparatus forms no part of the present invention, a detailed description of its structure is believed unnecessary herein. Any apparatus which defines a sealable chamber capable of containing a plurality of eggs in a liquid bath and which is adapted to develop a controlled pressure differential across the shells of of the eggs to force liquid material inwardly through the artificially-formed openings therein may be used.

In the preferred method of the invention, the eggs, after being immersed in the liquid bath, are subjected to a vacuum treatment to evacuate a portion of the air beneath the shells. It has been found that a sudden reduction in pressure may damage the eggs through shell breakage and through injury to the embryos and, therefore, it is important that only a gradual reduction of pressure occur within the vacuum chamber. Generally, a reduction in less than 10 seconds to an effective negative pressure (defined as one falling within the range of approximately 1 to 20 inches of mercury) has been found to cause egg damage. Periods in excess of 25 seconds are desirable and even longer intervals may be found advantageous.

Where negative pressures exceed approximately 15 inches of mercury, damage to the embryo by reason of the pressure drop is likely to occur. On the other hand, negative pressures less than approximately 1 inch of mercury are insufficient to cause the treatment material to pass inwardly through shell openings of a size exceeding .007 of an inch. It is to be understood that negative pressures within the range of approximately 1 to 20 inches of mercury, or within the preferred range of approximately 5 to 15 inches of mercury, and pressure reduction periods in excess of 10 seconds, may be varied considerably depending upon the particular eggs treating material used and the concentration and viscosity of that material. It is in all cases necessary that a sufficient amount of treatment material be introduced into the egg to produce the desired effect. For example, in the case of bactericides, the amount of material introduced into the eggs must be sufficiently great to cause an appreciable increase in the percentage of hatch, but must not be so great that it kills or injures the embryos. On the other hand, if insufficient amounts of material are introduced, the results may be worse than no treatment at all since the eggs may be contaminated by the introduction of bacteria or other undesirable organisms and materials in the same operation.

Following a reduction of pressure in the vacuum chamber normal atmospheric pressure is restored and, by reason of the increased pressure, some of the liquid treatment material is forced into each egg through the artificially-formed opening thereof to replace some of the air previously withdrawn during the evacuation cycle. It will be observed, therefore, that the treatment material dissolved in the liquid bath is not introduced into the eggs, at least to any appreciable extent, until after the evacuation cycle is completed and atmospheric pressure is restored. It follows that the time limitations disclosed above are primarily important in protecting the eggs and embryos against physical damage which might otherwise arise during the pressure reduction cycle rather than chemical damage or other damages arising after pressure is restored.

The use of negative pressure, followed by a restoration of atmospheric pressure, is desirable because all of the treatment material forced into the eggs will be retained therein by continued atmospheric pressure during subsequent incubation. However, where duration of contact is equally important, or more important, than the amount of material retained within the shells, the eggs may be subjected to positive pressure immediately after being placed within the pressure chamber. In other words, positive pressure in excess of atmospheric pressure may be applied as an alternative method for forcing treatment materials through the artificially-formed openings in the shells.

Since the artificial openings in all the eggs of a given batch are of substantially identical size, the quantity treatment material introduced into the eggs will be substantially identical despite the variations in the number and size of the natural pores in the shells. Therefore, while the pressure differential and the concentration of the active ingredient in the treatment material are of considerable significance in connection with the amount of bactericide or other substance to be forced through the shells, a principal factor of control in the treatment method is the size (and number) of the artificially-formed shell openings.

For a more complete understanding of the present invention, reference may be had to the following illustrative example:

*Example*

To determine the optimum amounts of bactericide and fungicide (Poly-Tech No. 5, a quaternary ammonium compound), and the optimum conditions for treating chicken eggs for hatching, the following tests were carried out:

Six tests were run using eggs from the same flock of hens gathered on the same day and at the same time. The eggs were evenly divided, each test being conducted with a total of 30 eggs.

Each egg of Group I was punctured with a small needle having a diameter of approximately .031 (1/32) of an inch, the puncture being placed in the air cell end of the egg. Thereafter, the punctured eggs were vacuum treated in a solution of 1½ ounces of Poly-Tech No. 5 per gallon, the negative pressure being 8 inches of mercury and being developed over a time interval of approximately 20 seconds. Thereafter, atmospheric pressure was restored and the artificially-formed openings were sealed with collodion.

The eggs of the second group received the same treatment as the eggs of Group I except that the openings were not sealed. The eggs of the third and fourth groups received the same treatment as those of Group II except that in the third group the concentration was 3 ounces of Poly-Tech No. 5 per gallon of water, and in the fourth group the concentration was 6 ounces of Poly-Tech No. 5 per gallon of water.

In the fifth group, each egg was punctured with a hole of .03 inch in diameter in the side rather than in the end of the egg. The solution used for treatment was 3 ounces of Poly-Tech No. 5 per gallon, and the conditions of the treatment were the same as set forth for Group I. Following treatment, the holes were similarly sealed with collodion.

The sixth group was a control group in which the eggs underwent no treatment at all. The following chart shows the different results from the experiments performed after the eggs of all groups were incubated. The conditions of incubation were the same for both the treated and control (untreated) lots of eggs.

| Group Number | No. and Percent of Eggs Hatched or Pipped | No. and Percent of Embryos Living at 11 Days | No. of Clear or Infertile Eggs | No. of Eggs in which Embryos Dead at 11 Days |
|---|---|---|---|---|
| 1 | 21 (70.0%) | 27 (90.0%) | 1 | 2 |
| 2 | 26 (87.7%) | 28 (93.3%) | 2 | 0 |
| 3 | 24 (80.0%) | 24 (80.0%) | 5 | 1 |
| 4 | 16 (53.3%) | 22 (73.3%) | 5 | 3 |
| 5 | 27 (90.0%) | 27 (90.0%) | 2 | 1 |
| 6 | 24 (80.0%) | 26 (86.7%) | 3 | 1 |

The tests reveal that material may be forced through the openings in the artificially-formed openings in the eggs by means of air pressure to achieve a beneficial effect. A comparison of tests No. 2 and No. 6 reveal that in the treated group there was an increase of 6.6 percent live embryos after 11 days in the treated batch. However, where the concentration of the bactericide was excessive (test 4), the material entering the eggs tended to kill the embryos and reduced the number of living embryos by a margin of 13.4 percent below the control group.

While in the foregoing we have disclosed an embodiment of the invention in considerable detail for purposes of illustration, it will be understood by those skilled in the art that many of these details may be varied without departing from the spirit and scope of the invention.

We claim:

1. In a method of introducing controlled amounts of fluid treatment materials into avian hatching eggs, the steps of artificially forming at least one opening through the shell of a hatching egg, said opening being of a size falling within the range of approximately 0.007 to 0.06 of an inch in diameter, placing said egg in a chamber at atmospheric pressure, gradually reducing the pressure within said chamber over a period of not less than approximately 10 seconds to a maximum negative pressure within a range between 1 to 20 inches of mercury to withdraw air from said egg through said opening, exposing the outer surface of said egg to a fluid treatment material capable of flowing through said opening, thereafter increasing the pressure within said chamber to force a predetermined quantity of said material through said opening into said egg to replace the air withdrawn therefrom, and thereafter maintaining said egg at a pressure no lower than atmospheric pressure to retain said material therein during subsequent incubation.

2. The method of claim 1 in which said opening is formed in the shell at the air cell end of the egg.

3. In a method for simultaneously introducing controlled amounts of treatment materials into a multiplicity of avian hatching eggs, the steps of artificially forming a small opening through the shell of each of a batch of avian hatching eggs, all of said openings being of substantially the same selected size within the range of approximately 0.007 to 0.06 of an inch in diameter, then placing all of the eggs of said batch in a chamber at atmospheric pressure, gradually reducing the pressure within said chamber over a period of not less than approximately 10 seconds to a maximum negative pressure within the range of 1 to 20 inches of mercury to withdraw air simultaneously from all of the eggs of said batch through said openings, exposing the outer surfaces of all of the eggs of said batch to a fluid treatment material capable of flowing through said openings, restoring atmospheric pressure within said chamber to force a predetermined and uniform quantity of said fluid treatment material through the openings of all of the eggs of said batch to replace the air withdrawn therefrom, and thereafter maintaining all of the eggs of said batch at a pressure no lower than atmospheric pressure to retain said material therein during subsequent incubation.

4. The method of claim 3 in which each of said openings is formed in the shell at the air cell end of the egg.

References Cited by the Examiner

UNITED STATES PATENTS

| | | | |
|---|---|---|---|
| 2,824,546 | 2/1958 | Klette | 119—1 |
| 2,851,006 | 9/1958 | Taylor | 119—1 |
| 3,120,834 | 2/1964 | Goldharft et al. | 119—1 |
| 3,123,045 | 3/1964 | Cosgrove et al. | 119—1 |
| 3,148,649 | 9/1964 | Moore et al. | 119—1 |

SAMUEL KOREN, *Primary Examiner.*

ALDRICH F. MEDBERY, *Examiner.*